United States Patent [19]

Tischer et al.

[11] Patent Number: 5,301,781
[45] Date of Patent: Apr. 12, 1994

[54] CLUTCH FOR VEHICLES

[75] Inventors: Dieter Tischer, Kirchneim/Teck; Bernd Niethammer, Nürtingen; Alfred Trzmiel, Grafenberg, all of Fed. Rep. of Germany

[73] Assignee: Hydraulik-Ring Antriebs- Und Steuerungstechnik GmbH, Nürtingen, Fed. Rep. of Germany

[21] Appl. No.: 994,918

[22] Filed: Dec. 22, 1992

[30] Foreign Application Priority Data

Dec. 22, 1991 [DE] Fed. Rep. of Germany ....... 4142744

[51] Int. Cl.⁵ ............................................. F16D 25/14
[52] U.S. Cl. ................................ 192/85 R; 192/91 R; 192/109 F; 137/487.5
[58] Field of Search ............... 192/85 R, 91 R, 109 F, 192/109 D; 137/487.5

[56] References Cited

U.S. PATENT DOCUMENTS

| | | | |
|---|---|---|---|
| 2,723,736 | 11/1955 | Alexandresch | 192/85 R X |
| 4,133,511 | 1/1979 | Hartmann et al. | 137/487.5 X |
| 4,478,237 | 10/1984 | Blake et al. | 192/85 R X |
| 4,488,574 | 12/1984 | Bartholomäus | 137/487.5 |
| 4,674,613 | 6/1987 | Sikorski | 192/85 R X |
| 5,036,965 | 8/1991 | Cortesi et al. | 192/85 R |
| 5,168,973 | 12/1992 | Asayama et al. | 192/85 R |

FOREIGN PATENT DOCUMENTS

| | | |
|---|---|---|
| 1785862 | 1/1959 | Fed. Rep. of Germany . |
| 3736584 | 10/1987 | Fed. Rep. of Germany . |
| 73048 | 4/1987 | France ................ 192/85 R |

OTHER PUBLICATIONS

Patent Abstracts of Japan; 62-265033; Nov. 17, 1987.

*Primary Examiner*—Leslie A. Braun
*Assistant Examiner*—Andrea Pitts
*Attorney, Agent, or Firm*—Robert W. Becker & Associates

[57] ABSTRACT

A vehicle clutch is comprised of a supply cylinder activated by a clutch pedal and a receiving cylinder for hydraulic fluid displaced from the supply cylinder when the clutch pedal is pressed down. A fluid line connects the two cylinders. A safety device is connected within the fluid line and comprises at least one throttle element for reducing the fluid flow from the receiving to the supply cylinder when a preset engaging speed for engaging the clutch is surpassed. The safety device includes a measuring orifice connected in parallel to the throttle element. A solenoid is provided which has a closing device for closing the fluid line between the two cylinders with the exception of the throttle element when a preset fluid pressure differential measured before and behind the measuring orifice is surpassed. Two pressure switches are coordinated with the measuring orifice for measuring the fluid pressure differential at the measuring orifice. The pressure switches actuate the solenoid for moving the closing device to close the fluid line. In a second embodiment the safety device has a switching piston held in an open position by a plate spring for closing the fluid line with the exception of the throttle element. The plate spring is adjusted such that its working range is within a descending portion of its force-travel distance characteristic curve. A solenoid and the pressure switches are eliminated in the second embodiment.

9 Claims, 7 Drawing Sheets

CLUTCH FOR VEHICLES

BACKGROUND OF THE INVENTION

The present invention relates to a clutch for vehicles having a first supply cylinder which is actuated by a clutch pedal and which is connected via a fluid line to a second receiving cylinder. The clutch further has a safety device connected within the fluid line between the first and the second cylinder, the safety device having at least one throttle element for reducing the fluid flow from the second to the first cylinder when a preset engaging speed for engaging the clutch is surpassed. The safety device also has a measuring orifice that is connected in parallel to the throttle element, wherein a closing means is provided for closing the fluid line between the first and the second cylinders with the exception of the throttle element when a preset fluid pressure differential, measured before and behind the measuring orifice, is surpassed.

Such clutches are hydraulically disengaged via the first supply cylinder and the receiving cylinder connected thereto by pressing down the clutch pedal. When driving off from a stop, the clutch must transfer the required engine torque for a rpm difference between the crankshaft and the gear shaft. This takes place during the engagement of the clutch and requires a sensitive handling on the part of the driver for the actuation (engaging) speed of the clutch depending on the gear in use as well as on the accelerator position from which the engine torque results.

Sometimes it happens that the foot of the driver accidentally slips off the clutch pedal so that the clutch pedal is suddenly released. Then the clutch engages with the highest possible engaging speed. This may result in damage to parts of the drive train and the tires since the resulting torque peak values may be a multiple of the nominal torque value of the engine.

In the known clutch of German Offenlegungschrift 37 36 584 the fluid connection between the supply and the receiving cylinder comprises a safety device in the form of a closing body. The closing body has axial grooves at its circumference via which the fluid can flow upon actuation of the clutch pedal. Furthermore, the closing body is penetrated by an axial bore which forms a throttle element. When undesirably high engaging speeds occur, the fluid will be dammed or restricted at the end face of the closing body and forces the closing body against the force of a spring into it closed position in which its end face rests at the housing wall. In this closed position, the axial grooves are closed so that the fluid on its return from the second cylinder to the first cylinder can only pass through the throttle element. This results in a reduction of the flow velocity, and the engaging speed of the clutch is reduced. The closing body is maintained in its open position by a coiled pressure spring. This coiled pressure spring has an increasing force-travel distance characteristic curve. This causes the closing body to be moved towards its closing position upon occurrence of the pressure head not suddenly, but slowly in correspondence to the characteristic curve of the spring. Therefore, only a slow throttle of the fluid flow occurs.

In another clutch known from German Gebrauchsmuster 17 85 882 the fluid flowing from the first supply to the second receiving cylinder and vice versa is throttled during engagement and disengagement of the clutch. When the hydraulic medium returns from the second cylinder to the first cylinder, a throttle disk is first comes to rest at the cylinder bottom so that the hydraulic medium can only flow through the throttle element of the throttle disk into the line toward the first cylinder. This throttling effect occurs every time when the clutch pedal is released.

It is an object of the present invention to provide a clutch of the aforementioned kind with which during a sudden release of the clutch pedal the main fluid path for the fluid from the second cylinder to the first cylinder is immediately closed.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

The vehicle clutch of the present invention in a first embodiment is primarily characterized by:

A first cylinder activated by a clutch pedal and a second cylinder for receiving hydraulic fluid from the first cylinder when the clutch pedal is pressed down:

A fluid line connecting the first and second cylinders;

A safety device connected within the fluid line, the safety device comprising:

a) at least one throttle element for reducing the fluid flow from the second to the first cylinder when a preset engaging speed for engaging the clutch is surpassed;

b) a measuring orifice connected in parallel to the throttle element;

c) a solenoid having a closing means for closing the fluid line between the first and the second cylinders with the exception of the throttle element when a preset fluid pressure differential, measured before and behind the measuring orifice, is surpassed; and d) two pressure switches coordinated with the measuring orifice for measuring the fluid pressure differential by measuring a fluid pressure before and behind the measuring orifice, the pressure switches actuating the solenoid for moving the closing means to close the fluid line.

In the first embodiment of the present invention the two pressure switches measure the fluid pressure before and behind the measuring orifice. The fluid pressure differential is characteristic for the flow velocity of the hydraulic fluid. When the clutch pedal is suddenly released, the upper limit of the fluid speed according to the fluid characteristic curve is surpassed. The piston of the first (supply) cylinder is accordingly rapidly returned. Therefore, a low pressure results in the first cylinder which is immediately recognized at the measuring orifice. As soon as the preset fluid pressure differential is surpassed the solenoid is activated which immediately moves the closing means into the closed position. Thus, the main fluid path of the fluid from the second (receiving) cylinder to the first (supply) cylinder is interrupted so that the fluid can flow only through the throttle element. Accordingly, the hydraulic fluid, despite the lack of the counter force exerted by the clutch pedal, can flow only in a delayed manner into the first (supply) cylinder so that even with a released clutch pedal the clutch is correctly engaged.

The clutch of the first embodiment preferably further comprises a check valve comprised of a valve seat and a valve closing member, with the throttle element positioned within the check valve. The throttle element is provided in the form of at least one depression at the contact side of the valve closing member or the contact side of the valve seat. In the alternative, the throttle element is provided in the form of at least one projection at the contact side of the valve closing member or the contact side of the valve seat. It is also possible to provide the throttle element in the form of at least one opening penetrating the valve closing member.

Preferably, the safety device comprises a base body and the measuring orifice is a through bore in the base body. Preferably, one of the pressure switches is a low pressure switch electrically connected to the solenoid and the other pressure switch is a high pressure switch electrically connected to the solenoid. During normal operation of the clutch pedal at a resulting high pressure of the fluid, the low pressure switch opens the electrical connection to the solenoid and the high pressure switch closes the electrical connection to the solenoid.

A second embodiment of the inventive clutch for vehicles is primarily characterized by:

A first cylinder activated by a clutch pedal and a second cylinder for receiving hydraulic fluid from the first cylinder when the clutch pedal is pressed down;

A fluid line connecting the first and the second cylinders;

A safety device connected within the fluid line, the safety device comprising:

a) at least one throttle element for reducing the fluid flow from the second to the first cylinder when a preset engaging speed for engaging the clutch is surpassed;

b) a measuring orifice connected in parallel to the throttle element; and c) a closing means, comprising a plate spring for holding the closing means in an open position, for closing the fluid line between the first and the second cylinders with the exception of the throttle element against the force of the plate spring when a preset fluid pressure differential, measured before and behind the measuring orifice, is surpassed, the plate spring being adjusted such that a working range thereof is within a descending portion of a force-travel distance characteristic curve thereof.

With the second embodiment of the present invention, the closing means is held in its open position by a plate spring thereby maintaining the measuring orifice in an open position. During normal operation of the clutch pedal the fluid can flow rapidly from the second (receiving) cylinder to the first (supply) cylinder. When the clutch pedal is suddenly released, the fluid pressure differential at the cross-section of the measuring orifice is so great that because of the pressure loss at the side of the plate spring the force at the opposite side of the closing means becomes much greater. Accordingly, the closing means can be moved with a high switching speed against the force of the plate spring so that the closing means suddenly closes the main fluid path for the fluid. Thus, the fluid can only flow through the throttle element from the second cylinder to the first cylinder. The rapid closure of the measuring orifice is achieved by adjusting the plate spring such that its working range is within the descending portion of the force-travel distance characteristic curve. Due to this special design of the plate spring, the clutch may be adjusted such that the closing means is suddenly moved into its closed position.

Preferably the throttle element is connected within the closing means. The closing means advantageously is a switching piston with two end faces, the end faces loaded by pressure from the first and the second cylinders. Preferably, the throttle element, in the direction of fluid flow from the first cylinder to the second cylinder, is parallel to the measuring orifice. Expediently, the inventive clutch according to the second embodiment further comprises adjusting screws for adjusting the position of the closing means within the safety device.

Description of Preferred Embodiments

Figure 1:
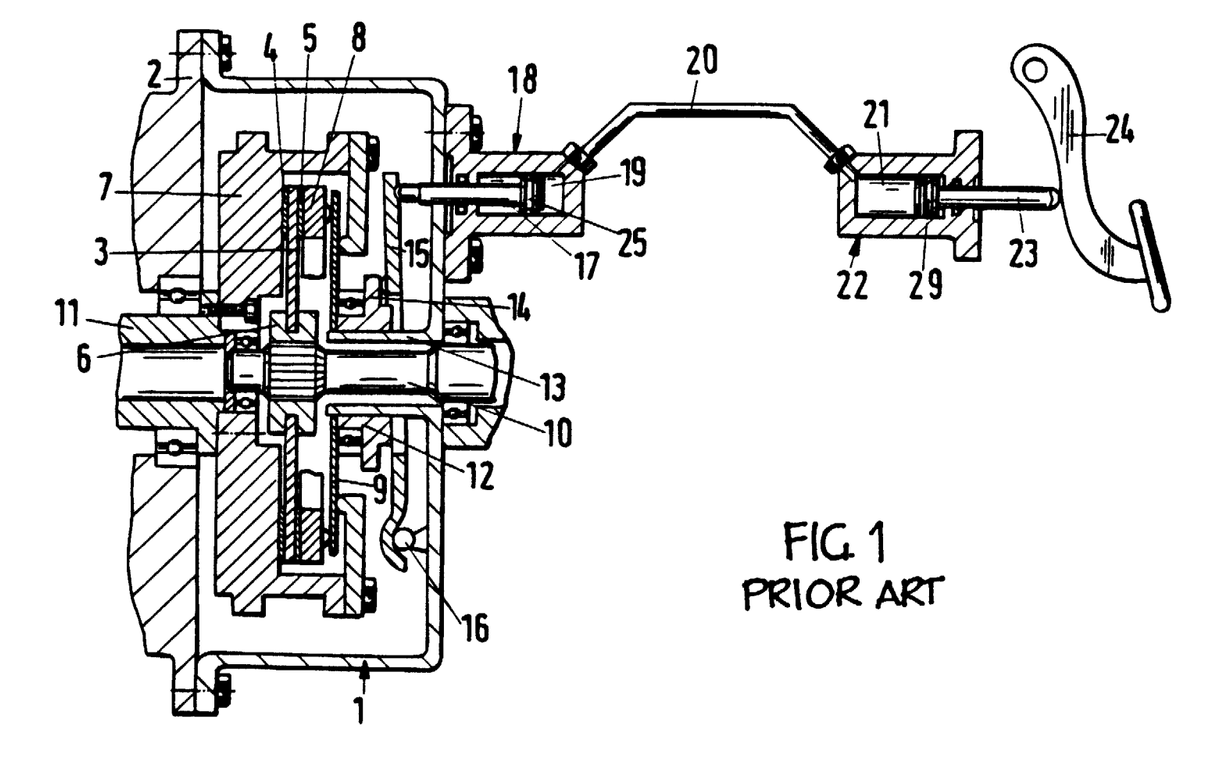
FIG. 1 shows in a cross-sectional view a conventional fluid-frictional clutch.

FIG. 1 shows a conventional fluid-operated clutch. Within the clutch housing 1 that is connected to the engine block 2 a follower disk 3 is provided having at its outer edge on both sides an annular frictional coating 4 and 5. The follower disk 3 is positioned on a bushing 6 and is located between a solid fly wheel 7 and a pressure disk 8. A plate spring 9 forces the pressure disk 8, the solid fly wheel 7, and the follower disk 3 together thereby creating a force transmission from the gear shaft 10 to the crank shaft 11. With a hydraulic-mechanically activatable release bearing 12 that is axially slidable on a guide 13 of the clutch housing 1, the pressure disk 8 may be freed from the plate spring 9 in order to, for example, disengage the clutch for shifting gears. The release bearing 12 has a radially outwardly extending flange 14 which is engaged by a one-armed lever 15 for axially moving the release bearing 12. The lever 15 is pivotable about a pivot axis 16 at the clutch housing 1. A piston rod 17 of a receiving (second) cylinder 18 engages the free end of the lever 15 that is opposite to the end connected to the pivot axis 16. The pressure chamber 19 of the receiving cylinder 18 is connected via a fluid line 20 with the pressure chamber 21 of a supply (first) cylinder 22. The piston rod 23 protrudes from the cylinder housing and rests at the clutch pedal 24 of the vehicle.

FIG. 1 shows the state of the clutch with the clutch pedal 24 not pressed down, i.e., the clutch is engaged. In order to disengage the clutch for a gear shifting step, the clutch pedal 24 is pressed down. Accordingly, the piston rod 23 is moved within the cylinder 22 so that the hydraulic medium or fluid present within the pressure chamber is forced via the fluid line 20 into the pressure chamber 19 of the receiving cylinder 18 provided at the clutch housing thereby displacing the piston 25 connected to the piston rod 17 into the clutch housing 1. The lever 15 pivots counter-clockwise and displaces the bushing-like release bearing 12. Accordingly, the pressure disk 8 is freed from the plate spring 9 so that the clutch is disengaged and the drive connection between the crankshaft 11 and the gear shaft 10 is interrupted.

When driving off from a stop, the clutch drags or rubs and thus bridges the rpm difference between the crankshaft 11 and the gear shaft 10. The clutch therefore must transmit the required engine torque at the respective rpm difference with slip. This occurs during the engagement of the clutch and requires a sensitive handling on the part of the driver with respect to the engaging speed of the clutch, depending on the selected gear as well as the accelerator position from which the engine torque results.

When the drive accidentally slips off the clutch pedal 24 or releases the clutch pedal 24 deliberately very fast, then the highest possible engaging speed for the clutch occurs. It has been shown that this may result in damage to the individual parts of the drive train of the vehicle and of the tires because the occurring torque peak values may be a multiple of the nominal torque value of the engine. This will be explained briefly with the aid of FIGS. 2 and 3.

Figure 2:
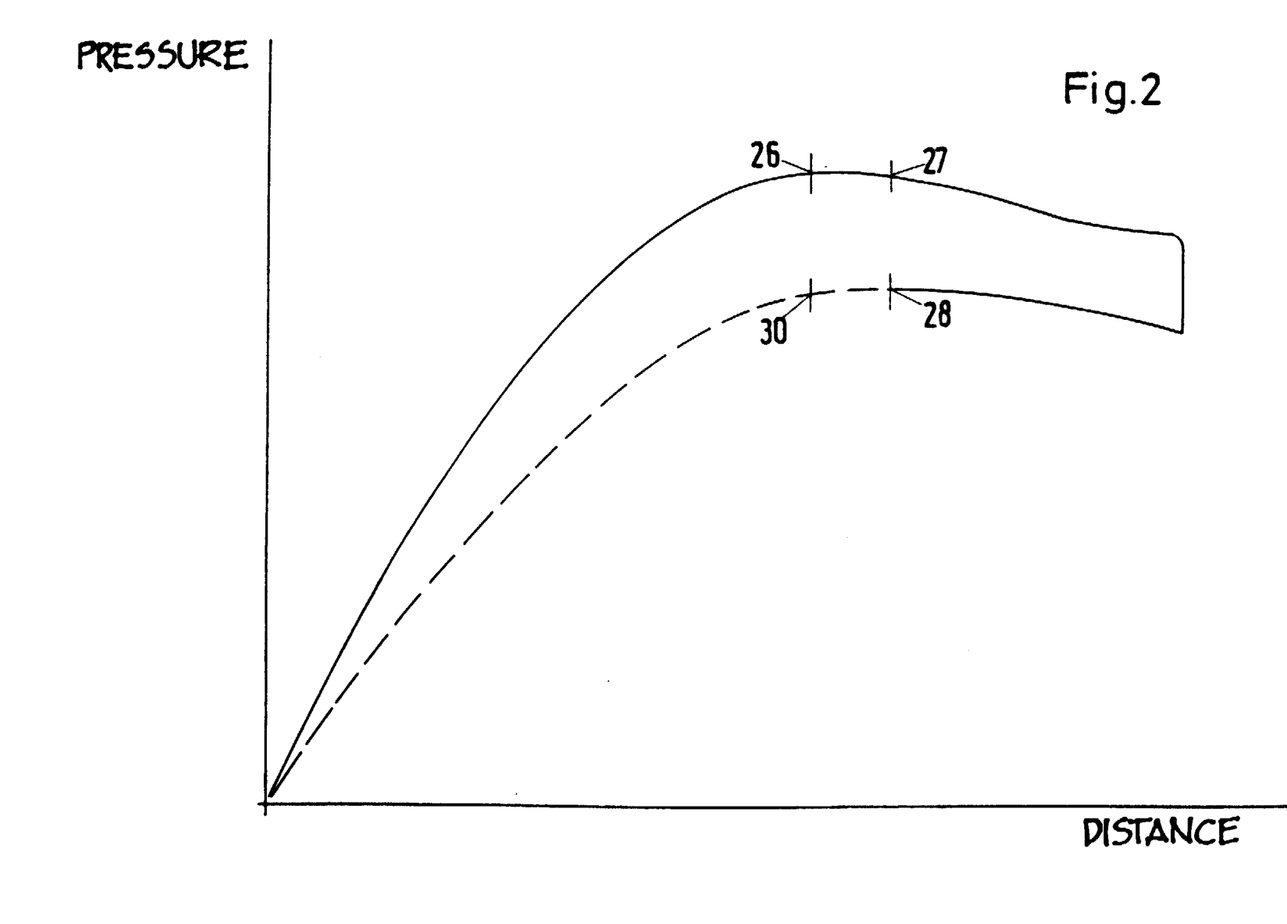
FIG. 2 shows a pressure-travel distance of the activation of the clutch according to FIG. 1.

When the clutch pedal 24 is pressed down for disengaging the clutch, the pressure, as indicated with a solid line in FIG. 2, increases rapidly and then levels off. At point 26 the separation of the clutch is initiated, i.e., the pressure plate 8 is freed from the pressure of the plate spring 9 as described above. After a relatively short period of time, the clutch is completely disengaged at the point 27 whereby the pressure within the hydraulic system has already decreased. After the completion of shifting gears, the pressure within the hydraulic system is further reduced. When the clutch pedal 24 is then slowly released the pressure initially rises again. At the point 28 the clutch begins to engage, i.e. the lever 15 pivots in the clockwise direction about the axis 16 due to the retensioning of the plate spring 9 and returns the piston rod 17 of the receiving cylinder 18. Thus, the hydraulic fluid or medium is forced via the fluid line 20 into the pressure chamber 21 of the first cylinder 2 whereby the piston 29 together with the piston rod 23 is returned. The clutch pedal 24 thus pivots toward its initial position. Until the clutch is completely engaged, the pressure within the hydraulic system still rises as is indicated with a dash-dotted line in FIG. 2. At the point 30 the clutch is completely engaged so that the drive connection between the crank shaft 11 and the gear shaft 10 is achieved. Now the pressure slowly decreases until the clutch pedal 24 has reached its initial position (FIG. 1).

The pressure-travel distance characteristic curve of the fluid-activated clutch is determined by the design of the plate spring 9. Depending on the wear of the clutch, the point of engagement 28, respectively, the point of disengagement 27 moves to the right of the characteristic curve. However, since in this area the characteristic curve is approximately horizontal, the actuating force remains almost constant over this distance.

Figure 3:
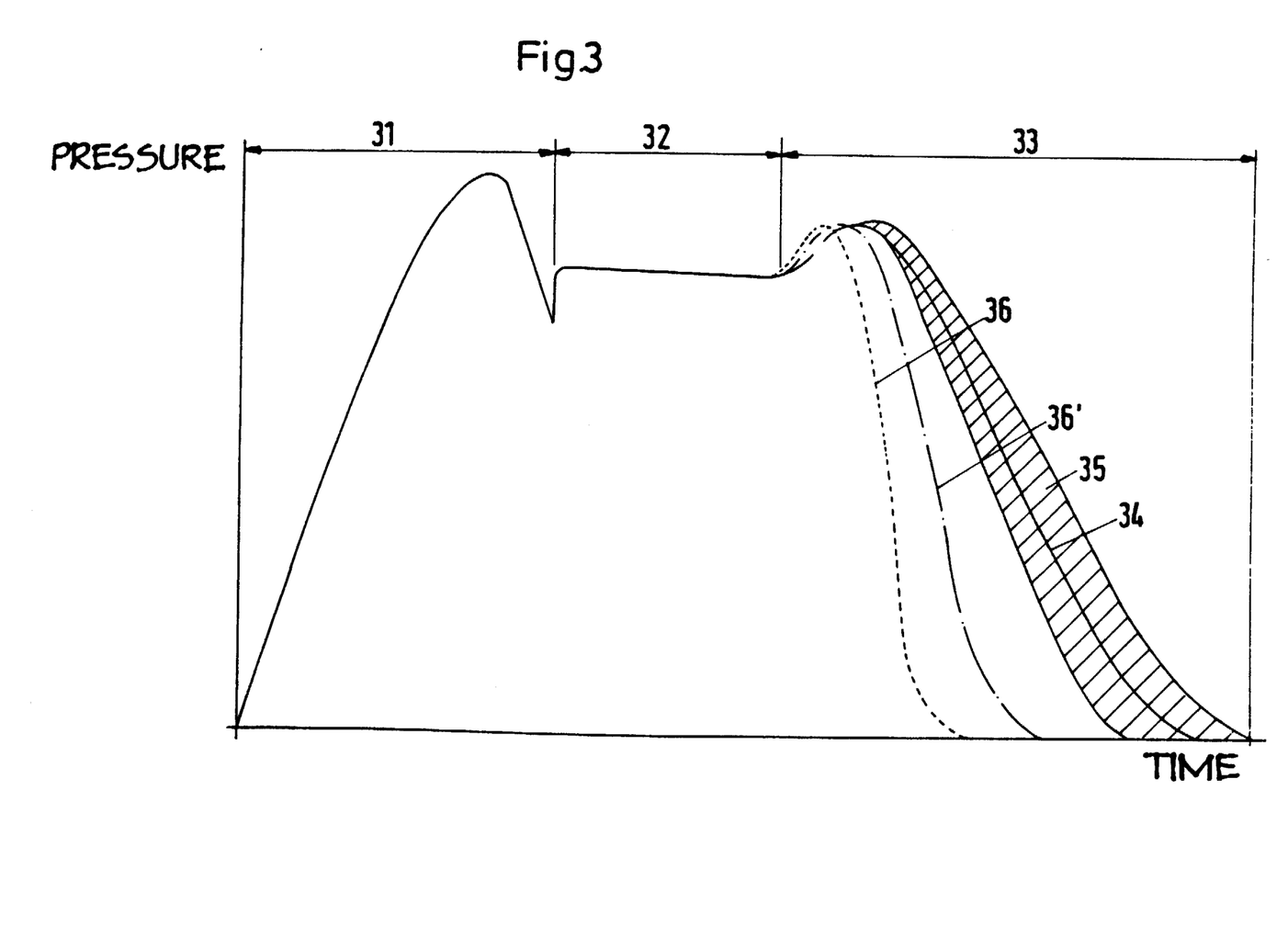
FIG. 3 shows a pressure-time curve resulting from the activation of the clutch according to FIG. 1.

FIG. 3 represents the pressure as a function of time during engagement and disengagement of the clutch. When the clutch pedal 24 is pressed down (switching range 31), the pressure initially increases rapidly and decreases shortly before reaching the point of complete disengagement (switching point 27 of FIG. 2). In the disengagement range 32, in which the clutch is disengaged and in which gear shifting takes place, the pressure remains approximately constant. After completion of gear shifting, the clutch pedal 24 is slowly released. During normal release of the clutch pedal 24 the curve portion 34 results within the switching range 33, i.e., the pressure is slowly reduced over time. This curve portion 34 lies within a hatched portion 35 representing the normal engaging speed of the clutch. In this range no excessive torque peak values occur so that no damage to parts of the drive train will be done.

However, when the clutch pedal 24 is suddenly released, for example, because the foot of the driver slips off the clutch pedal 24, a curve portion 36 (dashed line in FIG. 3) results, i.e., the fluid pressure within the system is reduced within the shortest possible amount of time. In this area the greatest possible engaging speed is reached, this resulting in the aforementioned torque peak values which may be a multiple of the nominal torque values of the engine. In this situation parts of the drive train may be damaged. The high engaging speed results from the fact that the counter force exerted by the activating device (clutch pedal 24) is not present and the clutch engages in the shortest possible amount of time.

Depending on the respective engaging speed, varying volumes of hydraulic fluid per time unit are moved within the fluid line 20 between the supply cylinder 22 and the receiving cylinder 18. The greatest volume stream is reached for the highest possible engaging speed, that is in the case in which the clutch pedal 24 is suddenly released.

Figure 4:
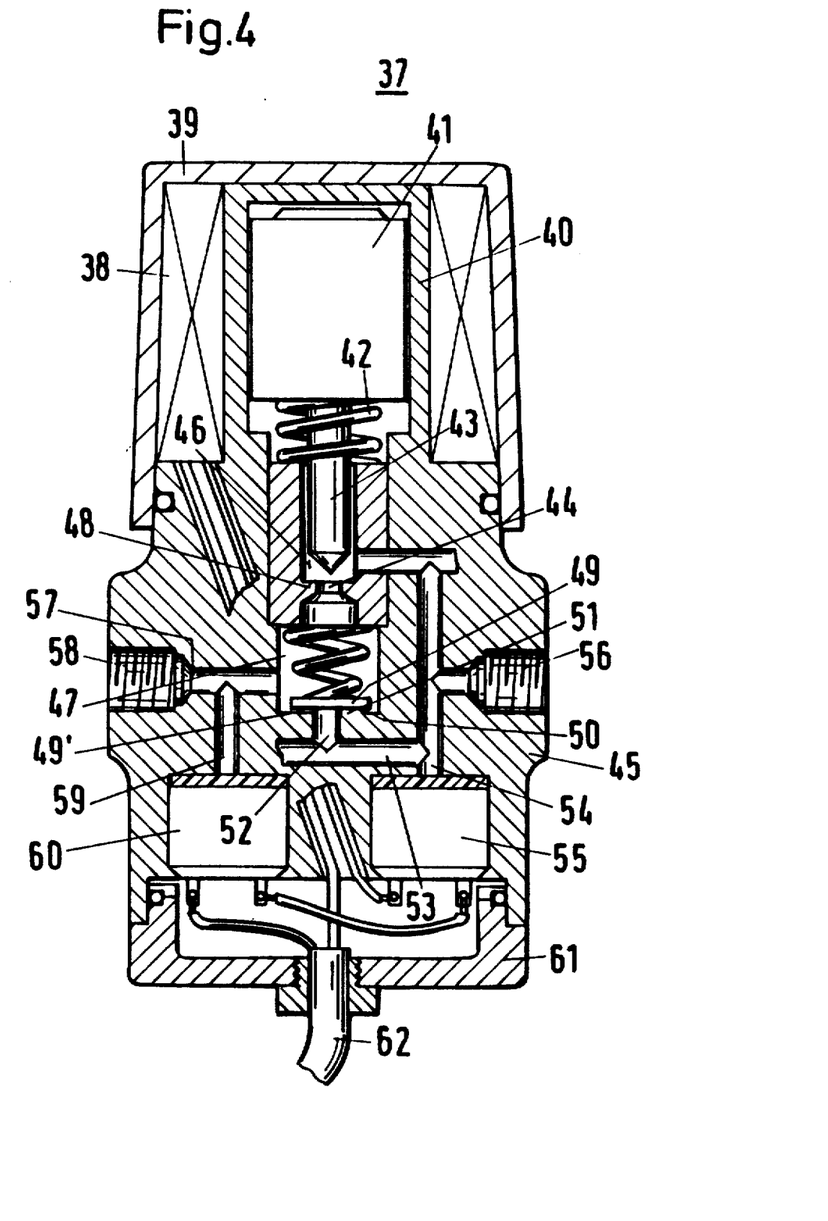
FIG. 4 is a cross-sectional view of the inventive safety device which is incorporated into a fluid-activated clutch according to FIG. 1.

In order to prevent a sudden engagement of the clutch the safety device represented in FIG. 4 is suggested. With the inventive safety device the engaging speed is detected and the fluid flow between the receiving cylinder 18 and the supply cylinder 22 is reduced such that the pressure decrease lies within the range of the curve portion 34 of FIG. 3 (the pressure-time characteristic curve). Thus, it is ensured that the parts of the drive train are not damaged even when the foot of the driver accidentally slips off the clutch pedal 24. The safety device is embodied such that the normal operating steps during engaging and disengaging the clutch, such as fast and sportive gear shifting are not effected. The safety device is only operative when the aforedescribed great pressure decrease occurs.

The safety device 37 is incorporated into the fluid line 20 within the area between the receiving cylinder 18 and the supply cylinder 22. The safety device 37 comprises a solenoid 38 which is enclosed by a cover 39. The solenoid 38 encloses a tubular pole shoe 40 in which an armature 41 is axially slidable. The armature 41 is slidable against the force of a pressure spring 42 upon supplying electrical current to the solenoid 38. The pressure spring 42 encloses a push rod 43 that is fixedly connected to the armature 41 and has a free end which is conically shaped. The conical free end of push rod 43 cooperates with a through bore 44 which is provided within the base body 45 of the safety device 37. The through bore 44 connects two fluid (pressure) chambers 46 and 47. The push rod 43 projects into the fluid (pressure) chamber 46, and a pressure spring 48 is positioned with the fluid (pressure) chamber 47 for forcing a check valve plate 49 into its closed position. The bottom 50 of the fluid chamber 47 which is facing away from the fluid chamber 46 has a central projection 51 on which rests the check valve plate 49. The projection 51 is penetrated by a bore 52 which is closed by the check valve plate 49.

The through bore 44 has a smaller cross-section than the two fluid chambers 46 and 47. The bore 52 which is arranged centrally within the base body 45, as are the fluid chambers 46 and 47, is connected via a transverse bore 53 with a parallel bore 54. The parallel bore 54 connects the fluid chamber 46 with a low pressure switch 55 which is located within the base body 45 of the safety device 37. The bore 54 is further connected via a connector 56 to the supply cylinder 22.

The fluid chamber 47 is connected via a transverse bore 57 provided within the base body 45 and via a connector 58 to the receiving cylinder 18. The transverse bore 57 is connected via a longitudinal bore 59 with a high pressure switch 60 arranged within the base body 45.

One end of the base body 45 has connected thereto the cover 39, and the other end has connected thereto a lid 61 through which an electric cable 62 for the pressure switches 55 and 60 as well as for the solenoid 38 is centrally guided.

During normal operation of the clutch pedal 24 the hydraulic medium flows from the supply cylinder 22 via the connector 56 of the safety device 37 into the bore 54. From there the fluid flows through the transverse bore 53 and the bore 52 into the fluid chamber 47. The check valve plate 49 is lifted off its valve seat 51 by the pressure of the hydraulic medium against the force of the pressure spring 48. Accordingly, the hydraulic fluid can flow freely via the transverse bore 57 to the connector 58 of the receiving cylinder 18. The check valve plate 49 and the projection 51 form a check valve which allows the hydraulic fluid to freely flow from the connector 56 to the connector 58 for quickly disengaging the clutch.

The hydraulic medium can also flow from the connector 56 via the bore 54 into the fluid chamber 46 and from there through the through bore 44 into the fluid chamber 47. The armature 41 is held in its end position by the force of the return spring 42, as can be seen in FIG. 4, whereby in this end position the push rod 43 is spaced from the inlet opening of the through bore 44. This portion of the safety device 37 represents a measuring orifice which is dimensioned such that the engaging speed within the curve portion 35 of the normal operative characteristic curve of FIG. 3 is not reduced.

When the clutch pedal 24 is correctly released, the hydraulic fluid flows in the opposite direction from the connector 58 via the transverse bore 57 into the fluid chamber 47. From here the fluid flows via the through bore 44 into the fluid chamber 46 and via the bore 54 to the connector 56. The check valve plate 49 is moved into its closed position (see FIG. 4) assisted by the force of the pressure spring 48.

When the clutch pedal 24 is now accidentally suddenly released, the safety device 37 prevents a fast engagement of the clutch. Such a fast engagement of the clutch, without the interposition of the safety device 37, the speed of the fluid flow would surpass the upper limit which is indicated by the line 36' of the pressure-time curve. The safety device 37 is designed such that from the speed of the hydraulic fluid flow signals can be derived. For this purpose, the pressure switches 55 and 60 are provided, the constructive design of which is essentially known in the art. They are arranged, when viewed in the flow direction of the hydraulic fluid, before and behind the measuring orifice 44 and detect via this measuring orifice 44 the pressure differential of the hydraulic fluid which is characteristic for the flow speed. As explained above, this measuring orifice 44 is dimensioned such that the engaging speed during proper operation of the clutch pedal 24 is not reduced.

The fluid pressures before and behind the measuring orifice 44 are detected by the pressure switches 55, 60. The pressure switch 60 acts as a means for closing the electrical connection and the pressure switch 55 acts as a means for opening the electrical connection. The pressure switches 55 and 60 are arranged in a serial connection and control the solenoid 38 with which the fluid line 22 between the supply cylinder 22 and the receiving cylinder 18 downstream of the measuring orifice 44 can be interrupted.

When the clutch is disengaged the same pressure is present before and behind the measuring orifice 44 which, in the chosen embodiment, is greater than 18 bar. When the clutch is engaged in a controlled manner the upper limit of the engaging speed (line 36' in the pressure-time curve of FIG. 3) is not reached. The system pressure results from the travel distance-force characteristic curve of the return spring 9 of the clutch. The system pressure decreases during the engaging step according to FIGS. 2 and 3. Due to the approximately uniform pressure before and behind the measuring orifice 44, the actuation sensation for the driver during pressing and releasing of the clutch pedal 24 remains intact. Due to the equal pressure the electrical connection via the contacts of the two pressure switches 55 and 60 remains separated, i.e., the solenoid 38 remains in the position in which the push rod 43 does not close the through bore 44. The two switches 55 and 60 are arranged and embodied such that the high pressure switch 60 remains closed for a system pressure of, for example, more than 18 bar, while the low pressure switch 55 remains open for such a pressure. Since the two switches 55 and 60 are arranged one after another within the electrical connection to the solenoid 38 (FIG. 9) the electric path to the solenoid 38 is open due to the open switch 55. The solenoid 38 is thus in its open position, i.e., the measuring orifice 44 is open. The hydraulic fluid therefore can flow freely through the open measuring orifice 44.

Figure 9:
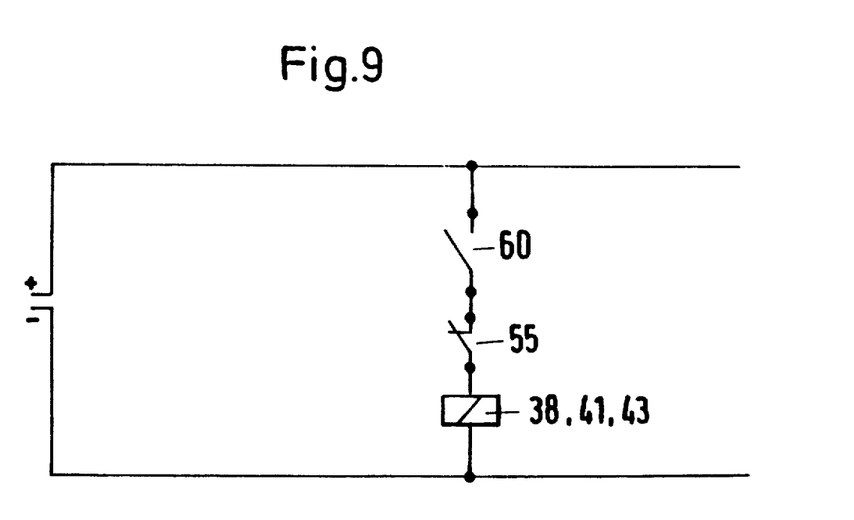
FIG. 9 is an electric diagram of the inventive safety device according to FIG. 4.

When the clutch pedal 24 is suddenly released in the aforedescribed manner, the upper limit of the speed (line 36' of the pressure-time curve of FIG. 3) of the fluid characteristic curve is surpassed. The clutch pedal 24 is quickly returned into its initial position assisted by the force of the return spring whereby the piston 29 of the supply cylinder 22 is also quickly returned. Accordingly, a low pressure is produced within the supply cylinder 22 so that the pressure within the supply cylinder 22 quickly decreases. This result s in the pressure falling below the threshold value of the low pressure switch 55 which in the chosen embodiment is, for example, 14 bar. At this moment, the lower pressure switch 55 is closed. Since the high pressure switch 60 is already closed (the high pressure is maintained for a sudden release of the clutch pedal), the electrical connection to the solenoid valve 38 is now closed due to the two closed switches 55 and 60 (FIG. 9). The solenoid 38 is thus activated and displaces the armature 41 against the force of the return spring 42 so that the measuring orifice 44 is closed by the push rod 43.

The check valve 49, 51 forms a throttle element through which the hydraulic fluid must flow. The end face (contact side) of the projection 51 and/or the contact side of the check valve plate 49 is provided with a depression or projection 49' so that a passage for the hydraulic medium is provided even when the check valve plate 49 rests at the projection 51. The check valve plate 49 may also be provided with a penetrating bore. The hydraulic fluid ejected from the receiving cylinder 18 now flows via the transverse bore 57 into the fluid chamber 47 and from there to the aforedescribed throttle element between the check valve plate 49 and the projection 51 into the bore 52. From here the hydraulic medium flows via the transverse bore 53 and the bore 54 to the connector 56 of the supply cylinder 22. The throttle element 49, 51 has a dimension such that during engagement of the clutch, in which the clutch pedal 24 is released and no return force is exerted, the preset upper limit for the engaging speed (line 36' of the pressure-time curve of FIG. 3) is not surpassed. The engaging speed lies within the area 35 of the pressure-time curve of FIG. 3 so that torque peak values do not occur and a damage of parts of the drive train is prevented. Due to the throttle element 49, 51, the hydraulic fluid flows in a delayed manner into the supply cylinder 22 despite the lack of a counter force exerted by the clutch pedal 24 so that even with a released clutch pedal 24 a proper engagement of the clutch occurs. The pressure within the receiving cylinder 18 is continuously and slowly decreased until the threshold value of the high pressure switch 60, in the given example 18 bar, has been reached. As soon as this pressure falls below this value the high pressure switch 60 opens and interrupts the electrical connection to the solenoid 38. The armature 41 is then returned by the force of the return spring 42 into its initial position whereby the measuring orifice 44 is reopened. The hydraulic medium is then able to freely flow from the receiving cylinder 18 via the measuring orifice 44 to the supply cylinder 22.

The switching off of the solenoid 38 advantageously takes place before the complete engagement of the clutch so that the remaining travel path of the clutch can be travelled with unthrottled speed.

With the inventive safety device 37 it is thus reliably prevented that for a sudden release of the clutch pedal 24 the clutch is suddenly engaged. When a sudden release occurs, the through bore 44 is immediately closed by the pressure switches 55, 60 so that the hydraulic medium can flow only via the throttle element 49, 51 from the connector 58 to the connector 56. Thus, the clutch engages with the desired low speed. As long as the driver operates the clutch pedal 24 properly, the safety device 37 is inoperative because the pressure differential before and behind the through bore 44 (measuring orifice) is approximately identical and the pressure differential is not greater than the pressure differential of the threshold values of the two pressure switches 55, 60.

The safety device, operating in the aforementioned manner, functions with three speeds during engagement with a released clutch pedal 24. The first speed is determined by the total pressure differential at the measuring orifice 44 resulting from the completely tensioned plate spring 9 for the completely disengaged clutch. Within the range of the engagement process, the second speed is determined by the throttle element 49, 51. The third speed is determined by the continuously decreasing pressure differential over the measuring orifice 44 due to the release of the plate spring 9 after the pressure differential over the measuring orifice 44 has fallen below a preset threshold value so that thereby the actuating sensation for the driver during operation of the clutch pedal 24 is maintained.

Figure 5:
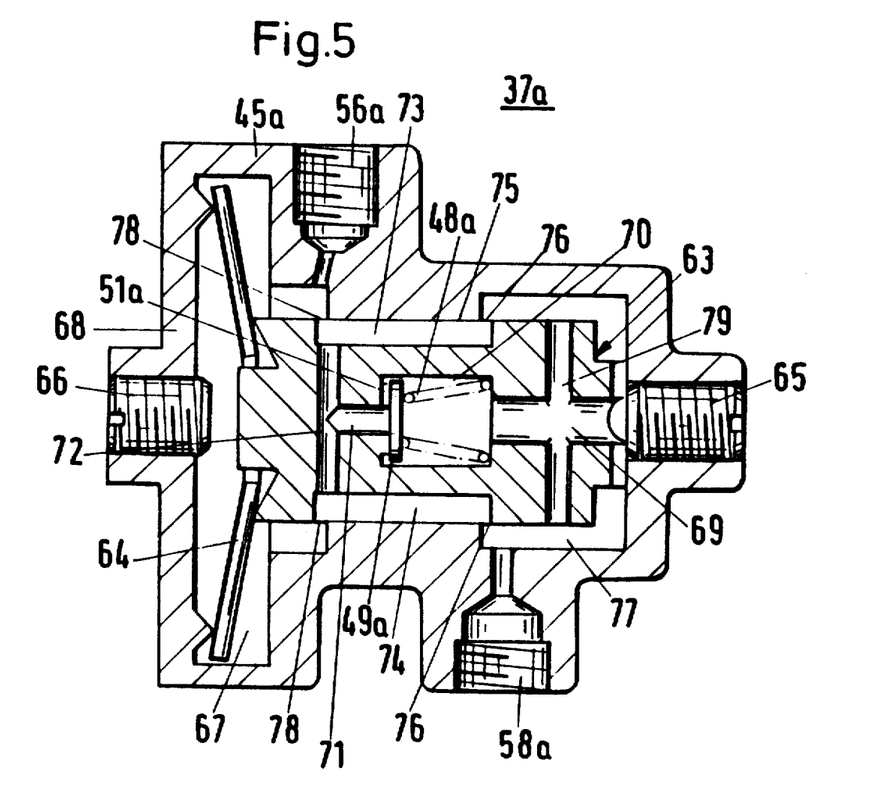
FIG. 5 is a cross-sectional view of a second embodiment of the inventive safety device.

FIG. 5 shows a second embodiment of the inventive safety device 37a which operates with only two speeds during engagement within the range of undesirable engaging speeds. This embodiment is designed such that without the use and incorporation of electronic components the hydraulic fluid flow is controlled. In this embodiment the pressure switches 55 and 60 are eliminated.

The safety device 37a has a base body 45a which is provided with a connector 56a for the supply cylinder 22 and a connector 58a for the receiving cylinder 18. Within the base body 45a a switching piston 63 is axially displaceable. It is loaded by the force of a plate spring 64 which forces the switching piston 63 into the initial position represented in FIG. 5. In this initial position the switching piston 63 rests at an adjusting screw 65 which is screwed into the base body 45a. At the oppositely arranged end the base body 45 is provided with a second adjusting screw 66. With the two adjusting screws 65, 66 the axial position of the switching piston 63 can be exactly adjusted.

The connector 56a opens into a fluid chamber 67 in which the plate spring 64 is positioned which is supported at the bottom 68 of the fluid chamber. The switching position 63 is provided with a central bore 69 that opens into the end face of the switching piston 63 facing the adjusting screw 65. The bore 69 extends into the fluid chamber 70 which is connected via a longitudinal bore 71 of a small cross-section with a diametral bore 72 which is connected to two diametrically oppositely arranged longitudinal grooves 73 and 74 of the switching piston. These longitudinal grooves 73, 74 are outwardly limited by the inner wall 75a.

In the initial position of the switching piston 63 according to FIG. 5, the longitudinal grooves 73, 74 are connected via a measuring orifice/throttling passage 76 with the fluid chamber 77 in which the connector 58a of the receiving cylinder 18 opens. At the other end, the longitudinal grooves 73, 74 are connected via a through flow opening 78 with the fluid chamber 67. The longitudinal bore 69 of the switching piston 63 is penetrated by a transverse bore 79 which connects the longitudinal bore 69 with the fluid chamber 77.

The longitudinal bore 69 has a smaller cross-sectional area than the fluid chamber 70 within the switching piston 63, but a greater cross-sectional area than the longitudinal bore 71 of the switching piston 63. The longitudinal bore 71 is closed by a check valve plate 49a which is loaded by the force of a pressure spring 48a. The check valve plate 49a rests at a projection 51a which is penetrated by the longitudinal bore 71. The end face (contact side) of the projection 51a and/or the contact side of the check valve plate 49a are provided with at least one depression and/or projection defining the throttle element, as demonstrated in the first embodiment, through which the hydraulic fluid can flow in a manner to be described infra when the clutch pedal 24 is accidentally released.

As long as the clutch pedal 24 is properly operated, the switching piston 63 is in the switching position represented in FIG. 5 into which it is forced by the plate spring 64. When the clutch pedal 24 is activated, the hydraulic fluid flows from the supply cylinder 22 via the connector 56a into the fluid chamber 67. From there, the hydraulic fluid flows via the through flow opening 78, the transverse bore 72, the longitudinal bore 71 and the open check valve 49a, 51a into the fluid chamber 70. From here, the fluid can freely flow into the longitudinal bore 69 and the transverse bore 79 to the connector 58a of the receiving cylinder 18. Furthermore, the hydraulic medium can flow from the through flow opening 78 via the longitudinal grooves 73, 74 and the measuring orifice/throttling passage 76 into the fluid chamber 77 from which the fluid can also flow to the connector 58a of the receiving cylinder 18. In this manner, a fast disengagement of the clutch is ensured since the hydraulic fluid can freely flow within the safety device. The check valve 49a, 51a allows the hydraulic medium to freely flow from the connector 56a in the described manner to the connector 58a. For a proper operation of the clutch pedal 24, the same pressure is present at both end faces of the switching piston 63. When the clutch pedal 24 is properly released and the clutch is properly engaged, the pressure differential over the two measuring orifices/throttling passages 76 is so small that the switching piston 63 remains in the switching position of FIG. 5. The hydraulic medium flows from the connector 58a via the longitudinal groove 73, 74 into the hydraulic chamber 67 and from there to the connector 56a. The check valve 49a, 51a is closed in this flow direction of the hydraulic fluid. Only the very small throttle element cross-sections allow for a small flow of hydraulic medium which, however, during proper operation of the clutch pedal 24 is hardly detectable.

However, when the clutch pedal 24 is suddenly released, the pressure differential over the measuring orifice/throttle passage 76 is so great that due to the respective pressure loss at the side of the plate spring 64 the force at the end face of the switching piston 63 facing the adjusting screw 56 is much greater. The pressure of the hydraulic fluid within the fluid chamber 77 is thus so great that the switching piston 63 is displaced from its switching position according to FIG. 5 with a great switching speed against the force of the plate spring 64 in the direction of the adjusting screw 66. During the entire engagement process, the switching piston 63 remains in this displaced position because the characteristic curve of the plate spring 64 decreases within its working range.

Figure 6:
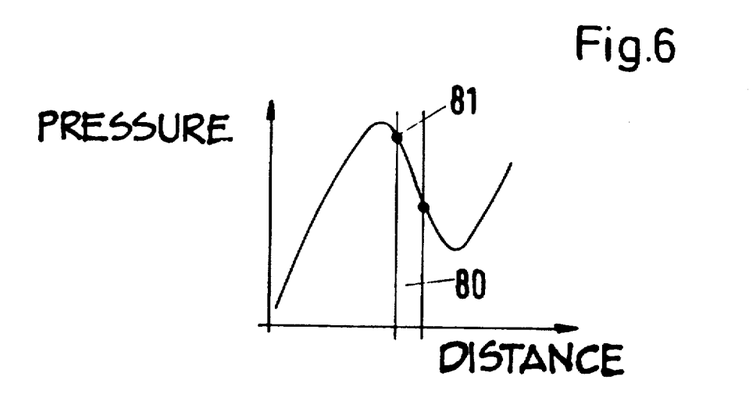
FIG. 6 shows a force-travel distance curve of a plate spring.

FIG. 6 shows the force-travel distance characteristic curve of a plate spring. In the safety device 37a the plate spring 64 is adjusted such that the working range 80 is located within the force-travel distance curve. When the switching piston 63 is in its switching position according to FIG. 5, the point 81 results on the force-travel distance characteristic curve. When the switching piston 63 is displaced in the aforedescribed manner from its first switching position, the force of the plate spring 64 decreases according to the force-travel distance characteristic curve. Accordingly, the switching piston 63 remains in its displaced position under the effect of the hydraulic pressure.

When the switching piston 63 is displaced in the described manner, the hydraulic fluid from the receiving cylinder 18 cannot flow through the measuring orifice/throttle passages 76 because they are closed by the displaced switching piston 63. The hydraulic fluid accordingly can only flow through the through bore 79 and the longitudinal bore 69 into the fluid chamber 70 of the switching piston 63. From there, the fluid can flow via the throttle element formed by a depression and/or projection within the check valve plate 49a and/or the projection 51, into the longitudinal bore 71, the transverse bore 72, and the through flow opening 78 into the fluid chamber 67 and from there to the connector 56a.

In this manner it is reliably prevented that for a suddenly released clutch pedal 24 the engagement occurs suddenly. In this manner overloads and damage to parts of the drive train are reliably prevented. Due to the reduced through flow cross-section the driver has a lack of sensation in the leg operating the clutch which indicates that an operating error has occurred.

In this second embodiment the safety device 37a operates with only two speeds. Via the measuring orifice 76 (throttling passage) the first speed for the total pressure differential is determined due to the fully tensioned plate spring 64 for a completely disengaged clutch. The second speed results from the sudden release of the clutch pedal 24 which causes the switching piston 63 to be displaced from its switching position so that thereby the engaging speed is determined by the throttle element at the check valve 49a, 51a during engagement of the clutch.

Figure 7:
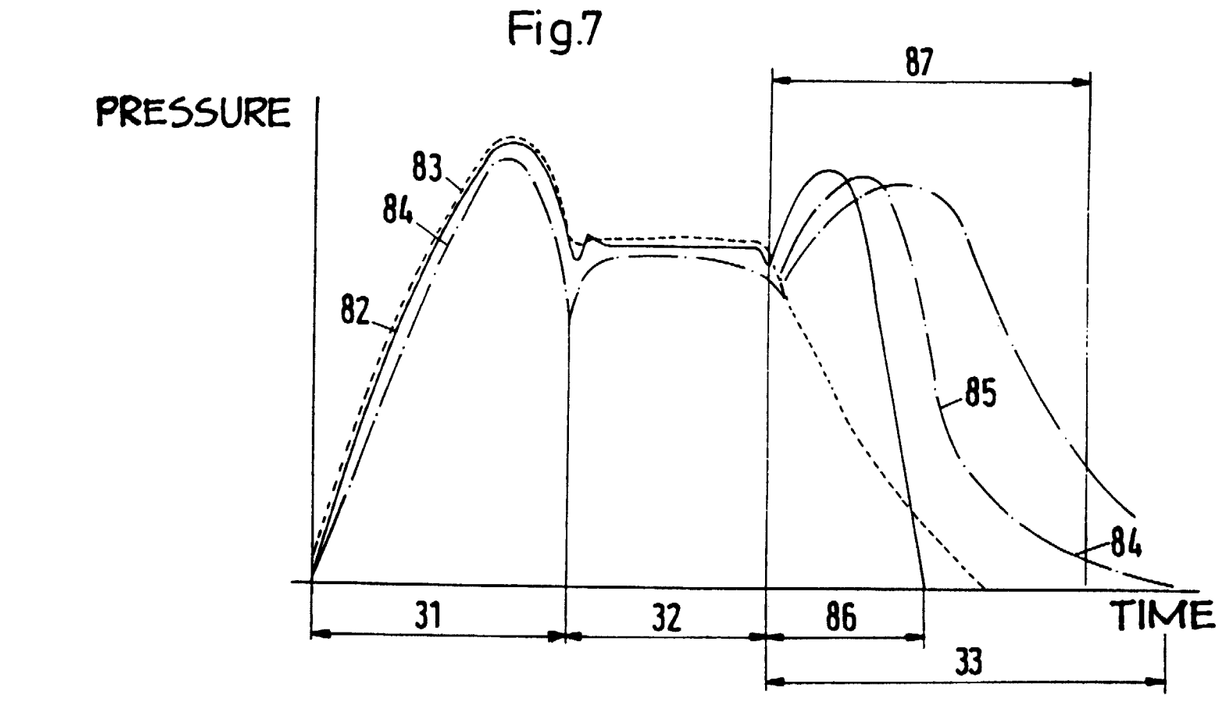
FIG. 7 shows a pressure-time curve of a clutch provided with the inventive safety device.
Figure 8:
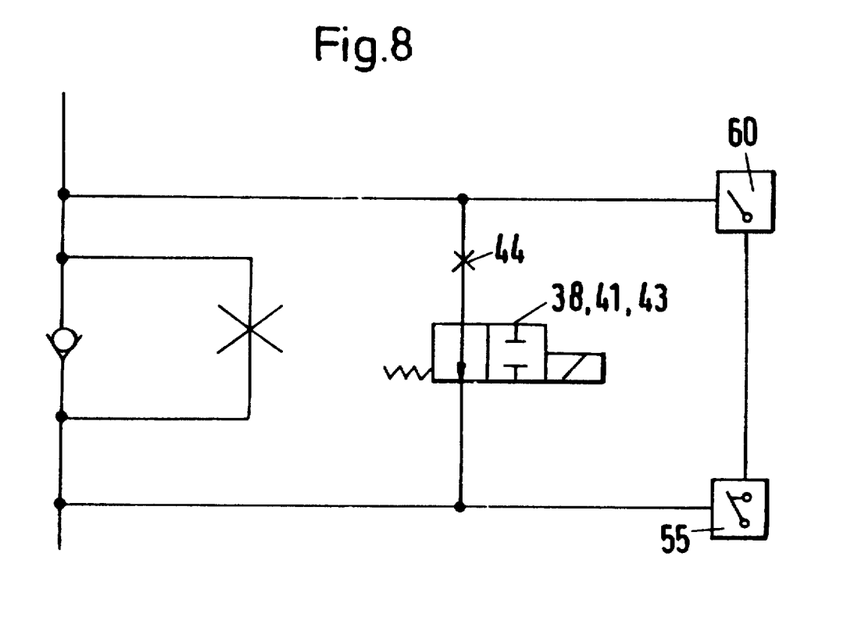
FIG. 8 is a hydraulic diagram of the inventive safety device according to FIG. 4.

FIG. 7 shows a pressure-time curve of the engaging step. With the solid line 82 the pressure curve without the safety device 37a is indicated. This characteristic curve corresponds to the curve of FIG. 3. The three switching ranges 31 to 33 are again represented which correspond to: the disengagement of the clutch (range 31), the maintenance of the disengagement of the clutch (range 32), and the reengagement of the clutch (range 33). In FIG. 7 the case in which the clutch pedal 24 is suddenly released is shown. The pressure within this system thus decreases with the fastest possible speed.

The dotted line 83 shows the pressure within the supply cylinder 22 with a safety device 37a being provided, and the dash-dotted line 84 shows the pressure within the receiving cylinder 18 with a safety device 37a being provided. The two characteristic curves 83 and 84 show the case in which the clutch pedal 24 is suddenly released. Due to the safety device 37a the pressure in the system does not decrease suddenly, but decreases slowly.

The dash-dotted characteristic curve 85 shows the pressure within the receiving cylinder 18 when the engagement of the clutch is properly performed. In this case, the speed of the clutch pedal 24 is considerably affected by the measuring orifice/throttling passage 76. It is no longer determined by the foot position of the driver.

The curve according to FIG. 7 shows that for an improper operation of the clutch pedal 24, the when no safety device 37a is provided within the characteristic curve switching range 33 only the area 86 is usable which is substantially smaller than the area 87 when a safety device 37a is provided. When comparing the two areas 86 and 87 it is obvious that the safety device 37a for a sudden release of the clutch pedal 24 reduces sufficiently the engaging speed of the clutch so that damage to drive train parts is prevented.

The present invention is, of course, in no way restricted to the specific disclosure of the specification and drawings, but also encompasses any modifications within the scope of the appended claims.

What we claim is:

1. A clutch for vehicles comprised of:
   a first cylinder activated by a clutch pedal and a second cylinder for receiving hydraulic fluid from said first cylinder when the clutch pedal is pressed down;
   a fluid line connecting said first and said second cylinders;
   a safety device connected within said fluid line, said safety device comprising:

a) at least one throttle element for reducing fluid flow from said second to said first cylinder when a preset engaging speed for engaging said clutch is surpassed;

b) a measuring orifice connected in parallel to said throttle element;

c) a solenoid having a closing means for closing said fluid line between said first and said second cylinders with the exception of said throttle element when a preset fluid pressure differential, is surpassed; and d) two pressure switches coordinated with said measuring orifice for measuring said fluid pressure differential by measuring a fluid pressure before entering and after exiting said measuring orifice, said pressure switches actuating said solenoid for moving said closing means to close said fluid line.

2. A clutch according to claim 1, further comprising a check valve comprised of a valve seat and a valve closing member, with said throttle element positioned within said check valve.

3. A clutch according to claim 2, wherein said throttle element is at least one depression at a contact side of said valve closing member.

4. A clutch according to claim 2, wherein said throttle element is at least one depression at a contact side of said valve seat.

5. A clutch according to claim 2, wherein said throttle element is at least one projection at a contact side of said valve closing member.

6. A clutch according to claim 2, wherein said throttle element is at least one projection at a contact side of said valve seat.

7. A clutch according to claim 2, wherein said throttle element is at least one opening penetrating said valve closing member.

8. A clutch according to claim 1, wherein said safety device comprises a base body and wherein said measuring orifice is a through bore in said base body.

9. A clutch according to claim 1, wherein one of said pressure switches is a low pressure switch electrically connected to said solenoid and the other pressure switch is a high pressure switch having an electrical connection to said solenoid, wherein, during normal operation of the clutch pedal at a resulting high pressure of the hydraulic fluid, said low pressure switch opens said electrical connection to said solenoid and said high pressure switch closes said electrical connection to said solenoid.

* * * * *